March 3, 1936. W. SCHNEIDER 2,032,506
SENSITIZING PHOTOGRAPHIC SILVER HALIDE EMULSIONS
Filed Jan. 14, 1933
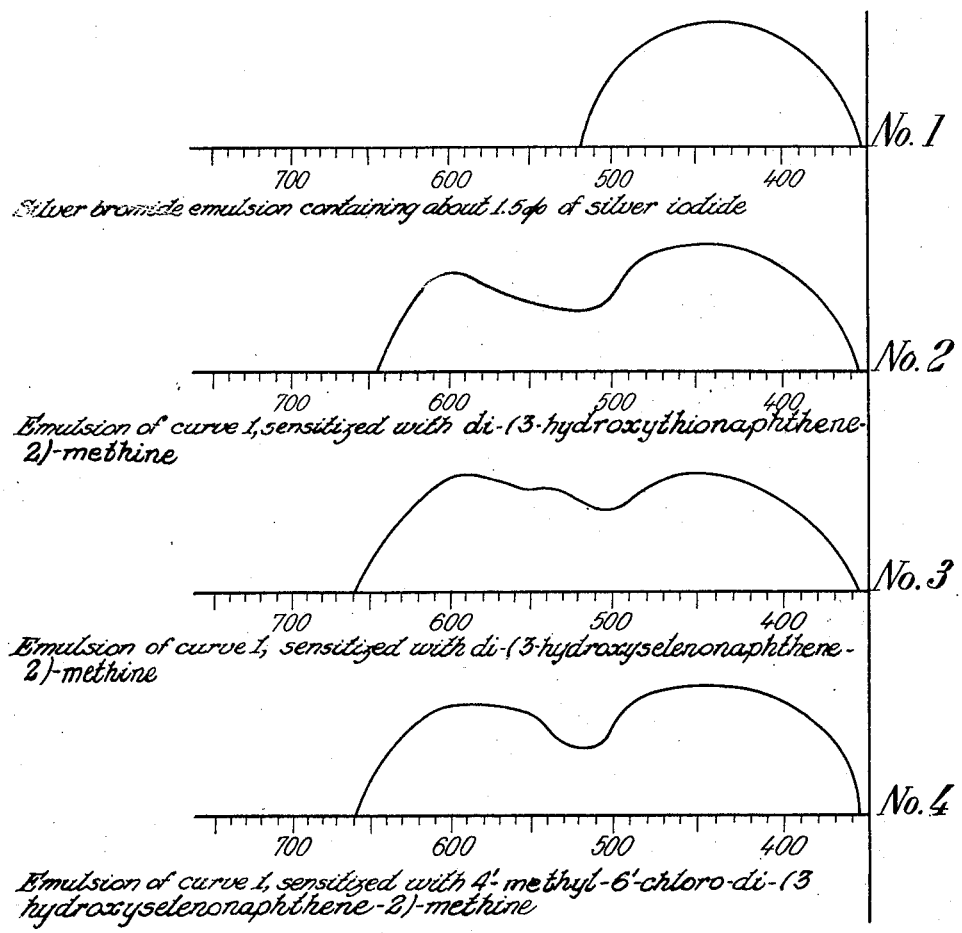
Inventor:
Wilhelm Schneider,
By Attorney
Philip S. Hopkins.

Patented Mar. 3, 1936

2,032,506

UNITED STATES PATENT OFFICE 2,032,506

SENSITIZING PHOTOGRAPHIC SILVER-HALIDE EMULSIONS

Wilhelm Schneider, Dessau in Anhalt, Germany, assignor to Agfa Ansco Corporation, Binghamton, N. Y., a corporation of New York Application January 14, 1933, Serial No. 651,846
In Germany January 19, 1932

10 Claims. (Cl. 95—7)

My present invention relates to sensitizing of photographic emulsions.

One of its objects is to provide such an emulsion the sensitiveness of which is raised over that to which the emulsion is normally sensitive. Further objects will be seen from the detailed specification following hereafter. Reference is made to the accompanying drawing which shows the spectrogram of a silver bromide emulsion containing about 1.5 per cent of silver iodide without the incorporation of a sensitizer and spectrograms of the same emulsion sensitized with my new sensitizers.

I have found that photographic silver halide emulsions are sensitized by incorporating in the emulsion a symmetrical or unsymmetrical dyestuff corresponding with the following general formula

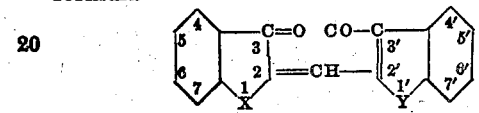

wherein X and Y stand for the bivalent atoms oxygen, sulphur or selenium or a salt of such a dyestuff.

Most of the sensitizers hitherto known have basic character. In contrast thereto the dyestuffs of the above formula are acid dyestuffs and are capable of forming salts with, for instance, alkali metals. The formation of salts occurs by reaction of bases with the ZH-group which may be a OH-, SH-, or SeH-group. Between the ZH-group and the -W group there exists a conjugate system of double bonds which produces the color characteristics of these compounds.

The simplest dyestuffs in which the two heterocyclic nuclei are linked together by one carbon atom are obtained by condensation of, for instance, coumaranone, 3 hydroxythionaphthene or 3-hydroxyselenonaphthene with chloroform or orthoformic acid ester and sodium ethylate.

The hydrogen linked to the bridging carbon atom can be replaced by alkyl or halogen. Compounds of such kind, having the following formula

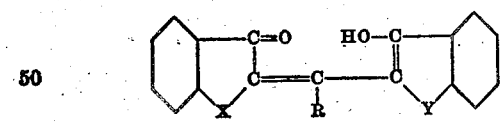

are obtained by condensing, for instance, coumaranone, 3-hydroxy-thionaphthene or 3-hydroxy-selenonapthene with tetra-halogen-methane, an ortho-acetic acid triester, an ortho-propionic acid triester and so on or with a ketone of the general formula

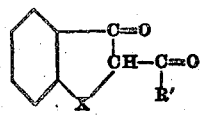

(wherein X has the meaning above defined and R' stands for alkyl).

Furthermore the hydrogen atoms of the ring systems can be substituted in 4.4'-, 5.5'-, 6.6'-, 7.7'-position by, for instance, halogen, alkyl or alkyloxy, sulphalkyl, or an unsubstituted or substituted amino group.

Furthermore the benzene nucleus can be replaced by condensed ring systems, for instance, naphthalene, anthracene, acenaphthene, diphenyloxide, or carbazole.

X and Y may be the same or different bivalent atoms of the group oxygen selenium and sulfur. When X and Y represent the same element there are obtained symmetrical dyestuffs, whereas asymmetrical dyestuffs are obtained when X and Y are different. Asymmetrical dyestuffs can be obtained by condensing an aldehyde of the general formula

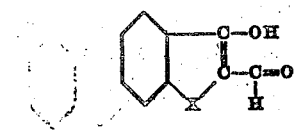

wherein X stands for oxygen, sulphur or selenium, with coumaranone, 3-hydroxythionaphthene, 3-hydroxyselenonaphthene, in acetic acid in the presence of sodium ethylate or hydrogen chloride.

Furthermore, by choosing suitable components for the condensation, unsymmetrical dyestuffs may be prepared in which the unsymmetrical nature is due to substitution in one of the ring systems, or to substitution of each ring system by different substituents, or by the same substituent in different positions.

3-hydroxyselenonaphthene and its substitution products may be made in the manner described in Berichte d. d. Chem. Ges. vol. 45, page 1835; vol. 47, page 2292 in Journal für prakt. Chemie, vol. 46, page 2653, or in Specification No. 396,011. Coumaranone and its substitution products may be made in the manner described in Berichte d. d. Chem. Ges. vol. 30, page 1077; vol. 33, page 3175; vol. 41, page 4272; vol. 43, page 214; and vol. 45, page 160.

In the accompanying drawing there are shown 4 spectrograms of a silver bromide emulsion containing about 1.5 per cent of silver iodide.

No. 1 shows the spectrograms of the initial sensitivity of the emulsion.

No. 2 shows the spectrograms of the emulsion sensitized with

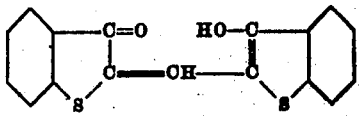

No. 3 shows the spectrogram of the emulsion sensitized with

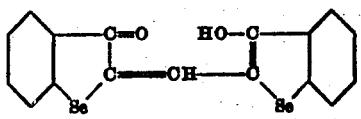

No. 4 shows the spectrogram of the emulsion sensitized with

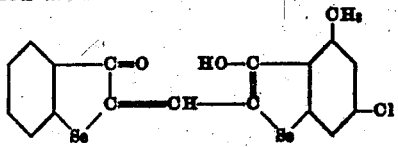

The dyestuffs may be added in form of a solution to the emulsion in any amount and in any stage of its manufacture. A suitable solvent is, for instance, alcohol. As a rule I have found 10 to 20 milligrams of dyestuff per kilogram of emulsion to be a suitable addition but my invention is not limited thereto.

The dyestuffs may furthermore be added to the emulsion in form of their silver salts dissolved in an alcoholic solution of ammonia.

For sensitizing the plates according to the bathing method they are, for instance, treated in an alcoholic aqueous solution of dyestuff with the addition of a small proportion of ammonia.

The following examples serve to illustrate the invention:—

*Example 1.*—The dye corresponding with the following formula

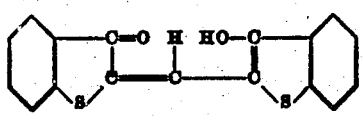

is obtainable by dissolving 6 grams of 3-hydroxythionaphthene in 15 cc. of alcohol, adding 1.6 cc. of chloroform and heating the solution to boiling in a reflux apparatus. There are then added 4.2 grams of sodium ethylate in form of a 5 per cent solution in alcohol whereupon the mixture assumes a violet color. After cooling the dye separates; is is filtered and washed with water. It may be recrystallized from alcohol and is then obtained in form of crystals of a metallic luster and a bluish-red color.

A silver bromide emulsion containing about 4 per cent of silver-iodide sensitized with the dye has a maximum of sensitiveness at a wave length of about 599 $\mu\mu$.

*Example 2.*—When working according to the method described in Example 1 but starting from 2 molecular proportions of 3-hydroxyselenonaphthene, 1 molecular proportion of chloroform and 3 molecular proportions of sodium ethylate, a dyestuff is obtained corresponding with the following formula

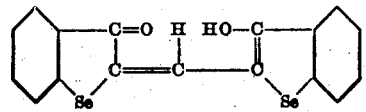

A silver bromide emulsion containing about 4 per cent of silver-iodide sensitized with the dye has a maximum of sensitiveness at a wave length of about 590 $\mu\mu$.

*Example 3.*—The dye corresponding with the following formula

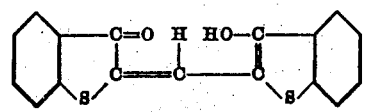

may be produced by dissolving 3.0 grams of 3-hydroxythionaphthene and 3.6 grams of 2-formyl-3-hydroxy-thionaphthene in about 30 cc. of glacial acetic acid at ordinary temperature and then introducing hydrochloric acid into the solution. The yellow compound which separates is suspended in a solution of caustic alkali whereupon the blue violet dye is formed. The same may be recrystallized from alcohol.

A silver bromide emulsion containing about 4 per cent of silver-iodide sensitized with the dye has a maximum of sensitiveness at a wave length of about 600 $\mu\mu$.

*Example 4.*—When working according to the method described in Example 1 and starting from 1 molecular proportion of 3-hydroxyselenonaphthene, 1 molecular proportion of 2-formyl-3-hydroxy-4-methyl-6-chlorothionaphthene and 3 molecular proportions of sodium ethylate, a dyestuff is obtained corresponding with the following formula

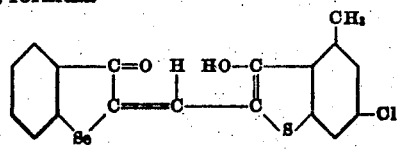

A silver bromide emulsion containing about 4 per cent of silver-iodide sensitized with the dye has a maximum of sensitiveness at a wave length of about 595 $\mu\mu$.

*Example 5.*—When working according to the method described in Example 1 and starting from 2 molecular proportions of 3-hydroxythionaphthene, 1 molecular proportion of carbontetrachloride and 3 molecular proportions of sodium ethylate a dyestuff is obtained corresponding with the following formula

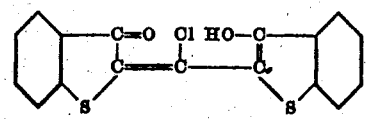

A silver bromide emulsion containing about 4 per cent of silver-iodide sensitized with the dye has a maximum of sensitiveness at a wave length of about 600 $\mu\mu$.

My invention is not limited to the foregoing examples nor to the specific details given therein. Numerous other embodiments are possible and I contemplate as included within my invention all such modifications and equivalents as fall within the scope of the appended claims. So, for instance, the benzene nuclei may contain other substituents. The formulæ of the dyes as given herein represent the molecular structure of my new dyes so far as known. If, however, in future it should become evident that the formulæ do not exactly correspond to the dyes this fact will not affect my invention since the dyes will be easily identified by the method of producing the same which has been fully described in the examples.

What I claim is:

1. A photographic material comprising a silver halide emulsion containing a dye corresponding with the general formula

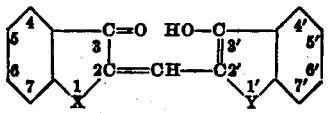

wherein X and Y stand for the bivalent atoms sulfur or selenium.

2. A photographic material comprising a silver-halide emulsion containing a dye corresponding probably with the formula

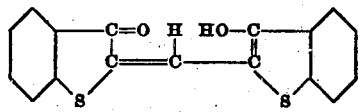

3. A photographic material comprising a silver-halide emulsion containing a dye corresponding probably with the formula

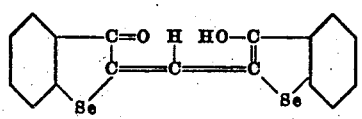

4. A photographic material comprising a silver-halide emulsion containing a dye corresponding probably with the formula

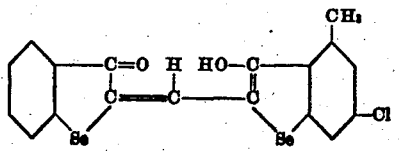

5. A photographic material comprising a gelatino-silver-bromide emulsion containing about 4 per cent of silver iodide having incorporated the dye corresponding probably with the formula

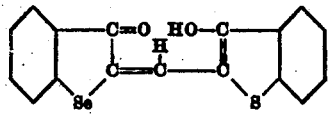

having a maximum of sensitiveness at about 599 µµ.

6. A photographic material comprising a gelatino-silver-bromide emulsion containing about 4 per cent of silver iodide having incorporated the dye corresponding probably with the formula

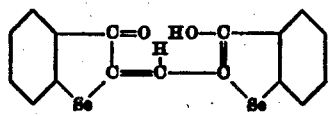

having a maximum of sensitiveness at about 590 µµ.

7. A photographic material comprising a gelatino-silver-bromide emulsion containing about 4 per cent of silver iodide having incorporated the dye corresponding probably with the formula

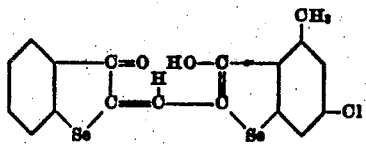

having a maximum of sensitiveness at about 595 µµ.

8. A photographic material comprising a silver halide emulsion containing a di-(3-hydroxythionaphthene-2)-methine dye.

9. A photographic material comprising a silver halide emulsion containing a di-(3-hydroxyselenonaphthene-2)-methine dye.

10. A photographic material comprising a silver halide emulsion containing a (3-hydroxythionaphthene - 3 - hydroxyselenonaphthene) - 2 . 2 - methine dye.

WILHELM SCHNEIDER.